July 3, 1951  A. ZUKOR  2,559,102
SAFETY SEAT FOR CLEANING WINDOWS
Filed Aug. 4, 1948  2 Sheets-Sheet 1
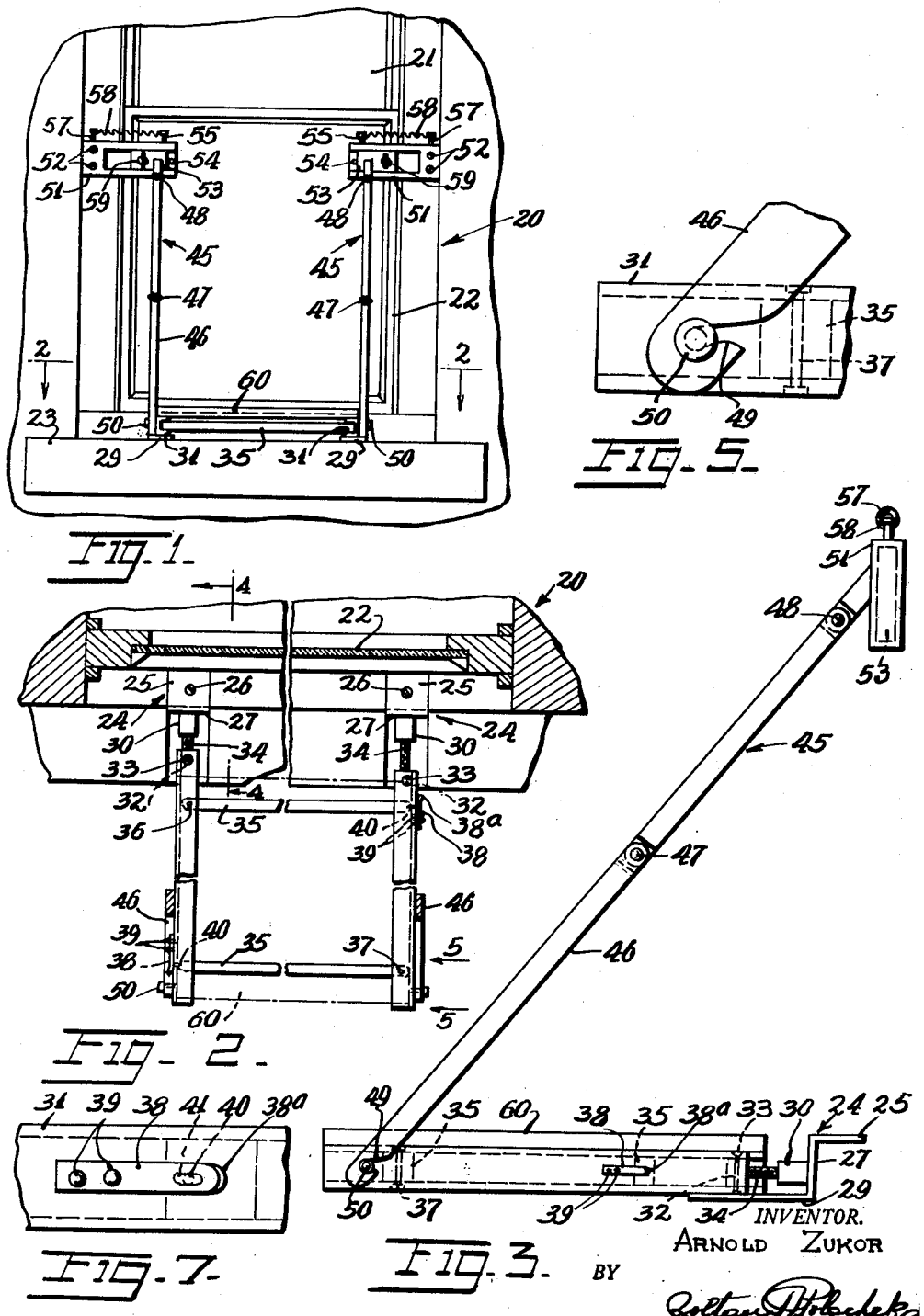
INVENTOR.
ARNOLD ZUKOR
BY
ATTORNEY July 3, 1951  A. ZUKOR  2,559,102
SAFETY SEAT FOR CLEANING WINDOWS
Filed Aug. 4, 1948  2 Sheets-Sheet 2

INVENTOR.
ARNOLD ZUKOR
BY
Zoltan Holecheck
ATTORNEY

Patented July 3, 1951

2,559,102

UNITED STATES PATENT OFFICE 2,559,102

SAFETY SEAT FOR CLEANING WINDOWS

Arnold Zukor, Bronx, N. Y.

Application August 4, 1948, Serial No. 42,365

8 Claims. (Cl. 304—24)

1

This invention relates to new and useful improvements in a safety seat for cleaning windows.

More particularly, the invention proposes the construction of a novel safety seat which may be extended from the outside of a window and upon which one may seat himself for cleaning the outside surfaces of the window panes and for hanging out and removing wash from a pulley-type washline and which will function to prevent an accidental dropping out of a window while leaning the body out of an open window during the summer months to get fresh air.

Still another object of the present invention proposes the construction of a safety seat the parts of which are foldable against the window frame in a manner to be less conspicuous when not in use.

It is a further object of this invention to so construct the seat so that the support portions thereof are all secured to the window frame at all times and which may be quickly and easily assembled when the seat is to be used.

It is a further object of this invention to construct a novel safety seat for windows which is foldable and which may be quickly and easily assembled without the use of tools, which is simple and durable and which can be manufactured and offered for sale at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is an outside elevational view of a window frame provided with a safety seat constructed in accordance with the present invention.

Fig. 2 is a horizontal sectional view taken on the line 2—2 of Fig. 1 and having portions thereof broken away to reduce the overall size thereof.

Fig. 3 is a side elevational view of the safety seat per se, looking from the right side of Fig. 1.

Fig. 5 is a partial side elevational view looking in the direction of the line 5—5 of Fig. 2.

Fig. 7 is a partial side elevational view looking in the direction of the line 7—7 of Fig. 6.

2

Figure 9:
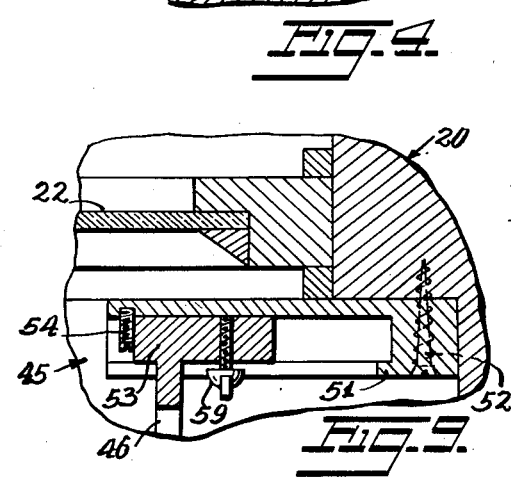
Figure 8:
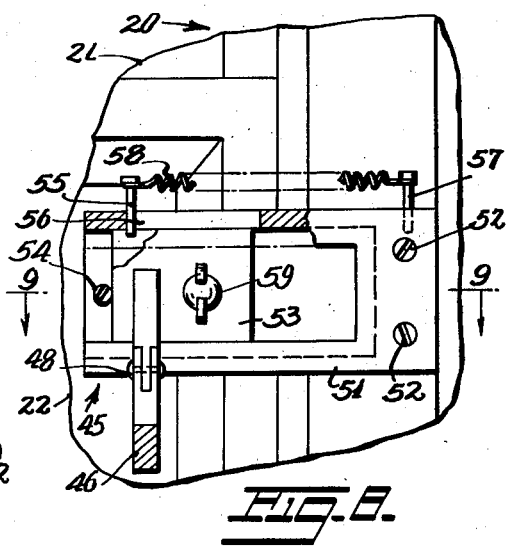
Fig. 8 is an enlarged detailed view of a portion of Fig. 1 having a portion thereof broken away to reveal interior construction.

Fig. 9 is a horizontal sectional view taken on the line 9—9 of Fig. 8.

Figure 10:
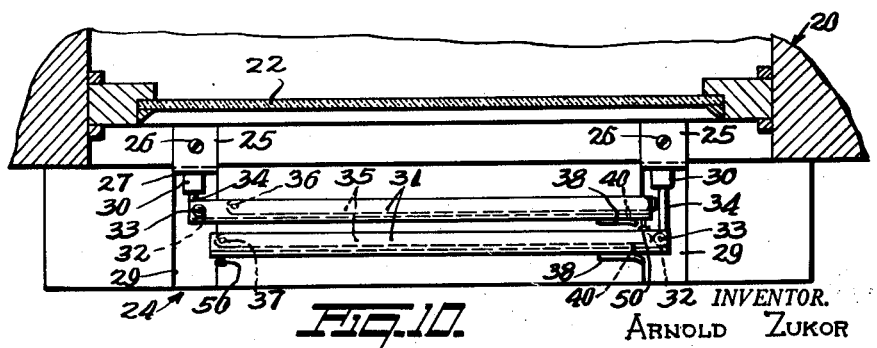

Fig. 10 is a plan view of the bottom portion of the seat folded into its inoperative position.

The safety seat for cleaning windows, in accordance with the present invention, is shown applied to a window frame 20 which slidably supports a pair of sashes 21 and 22 for vertical movement in the window frame 20. On the outside of the building structure beneath the window frame 20, there is the usual projecting stone ledge 23.

Figure 4:
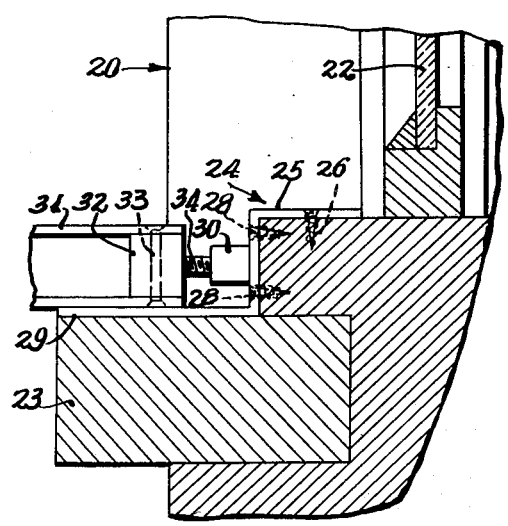
Fig. 4 is an enlarged partial vertical sectional view taken on the line 4—4 of Fig. 2.
Figure 6:
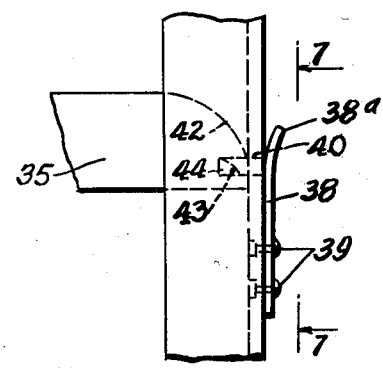
Fig. 6 is an enlarged detailed view of a portion of Fig. 2.

The safety seat includes a pair of spaced brackets 24 each of which includes a top portion 25 secured to the top face of the bottom portion of the window frame 20 by a single screw 26. At their outer ends, the top portions 25 of the brackets 24 continue into vertical depending portions 27, each of which is secured to the depending face of the window frame 20 by spaced screws 28. The lower end of each of the vertical depending portions 27 continues into horizontal portions 29 which lie on the top face of the stone ledge 23, see Fig. 4. The exposed face of each of the vertical depending portions 27 of the brackets 24, between the screws 28, is formed with a projecting internally threaded boss 30.

The seat further includes a pair of spaced channel members 31 which extend from the brackets 24 and which have their open sides directed toward each other. The inner ends of the channel members 31 rest on the top faces of the horizontal portions 29 of the brackets 24, as clearly shown in Fig. 4. A block 32 is inserted into the inner end of each of the channel members 31 and the channel members 31 are pivotally attached to the blocks 32 by means of vertical pins 33 which pass through those parts. Each block 32 is formed with a radially extending threaded stem 34 which is threaded into the threaded boss 30 of the respective bracket 24.

The threaded stem 34 of one of the channel members 31 is slightly longer than the threaded stem of the other channel member so that the pivot point of one of the channel members will be slightly forward of the pivot point of the other channel member 31, when the threaded stems 34 are tightly threaded into their respective bosses to permit the channel members 31 to be pivoted to inoperative positions alongside one another on the top face of the stone ledge 23, as shown in Fig. 10. To permit this movement of the channel members 31 to inoperative positions, the brackets 24 are spaced from each other a distance slightly greater than the length of the channel members 31 from the pins 33 to the outer ends thereof.

Each of the channel members 31 pivotally supports a bar 35 for extension across the space between the adjacent faces of the channel members 31 at spaced points along the length thereof, as shown in Fig. 2. One of the bars 35 is pivotally supported within its respective channel member 31, closely adjacent its inner end, by a vertical pin 36. The other of the bars 35 is pivotally supported within its respective channel member 31, closely adjacent its outer end, by a vertical pin 37.

Means is provided for releasably retaining the free ends of the bars 35 in position within the opposed channel member 31 when the bars 35 are extended between the channel members. This means is characterized by a leaf spring 38, for each of the bars 35, fixedly secured at one end to the side of the channel member 31 engaged by the free end of each of the bars 35, by spaced rivets 39. The free end of each leaf spring 38 is formed with a latch pin 40 which projects to the interior of the channel member 31 through an enlarged opening 41 formed in the side of the respective channel member 31.

The free end of each bar 35 is formed with a cam surface 42 arranged to cooperate with a complementary cam surface 43 formed on the inner end of the latch pin 40. When each bar 35 is pivoted to its operative position the cam surfaces 42 and 43 engage one another causing the respective latch pin 40 to be urged outward against the holding action of the respective leaf spring 38. Each bar 35 adjacent the end of the cam surface 42 is formed with a recess 44 into which the latch pin 40 is adapted to engage for locking the respective bar 35 against pivotal movement when the right angular position of the bars with relation to the channel members 31 is reached. The free ends 38ª of the leaf springs 38 are bent away from the sides of the channel members 31 providing a finger grip by which the ends may be manually gripped for flexing the springs 38 to disengage the latch pins 40 from the recesses 44 freeing the bars 35 to be pivoted to their inoperative positions within the channel members 31.

From Fig. 2 it will be noted that the threaded stems 34 extend from the blocks 32 at a point to be engaged by the channel members 31 when they have been pivoted to their operative extended positions to prevent pivoting beyond that operative position and so prevent accidental disengagement of the free ends of the bars 35 from their respective channel members 31.

Inclined supports 45 are provided between the free ends of the channel members 31 and the window frame 20 to assist in supporting the free ends of the channel members 31. Each of the inclined supports 45 comprises an elongated rod 46 formed of three sections pivotally connected together by spaced pins 47 and 48. The bottom ends of the rods 46 are formed with hooks 49 releaseably engageable with headed studs 50 mounted on the outer ends of the channel members 31.

Means is provided for horizontally slidably supporting the top ends of each of the elongated rods 46 to be movable between operative positions shown in Fig. 1 and inoperative positions depended along the sides of the window frame. This means comprises a pair of elongated tracks 51 secured in a horizontal position at their outer ends to the sides of the window frame 20 by means of screws 52. The inner ends of the tracks 51 are open and blocks 53 are slidably engaged into the open ends. The top ends of the rods 46 are integrally formed with the blocks 53 and extend downwardly and forwardly therefrom. Set screws 54 close the open ends of the tracks 51 and prevent accidental disengagement of the blocks 53 from the open ends of the tracks 51.

Resilient means is provided for urging the blocks 53 into inoperative positions at the outer ends of the tracks 51. This resilient means comprises a pin 55 which extends from each block 53 through an elongated slot 56 formed in the top portion of the respective track 51. A second pin 57 extends vertically from the outer end of each track, and a contraction spring 58, see Figs. 1 and 8, has its ends attached to the pins 55 and 57 for holding the blocks 53 in inoperative positions within the outer ends of the tracks 51.

In the inoperative positions of the blocks 53, the ends of the elongated rods 46 pivot about the pins 48 and assume inoperative positions depended along the sides of the window frame 20. The pivot pins 47 are provided to permit the overall length of the rods 46 to be reduced to facilitate packing of the seat for shipping purposes.

Means is provided for holding the blocks 53 in operative positions at the inner ends of the tracks 51 and abutting the set screws 54 as illustrated in Figs. 1 and 8. This means comprises thumb screws 59 threadedly engaged through the blocks 53 to be tightened against the base wall of the respective track 51, as shown in Fig. 9. In this operative position, the rods 46 are in proper alignment with the headed studs 50 to permit the hooks 49 to be conveniently engaged with those headed studs 50.

A seat 60, in the form of a flat board, rests on the top faces of the channel members 31 and upon which one may seat himself for washing the outside surfaces of the window panes of the sashes 21 and 22 or for hanging out or removing wash from a line which extends from the window frame 20. In its extended position the seat also acts to prevent one from accidentally falling out of the window when the top portion of the body is extended from the open window to get fresh air during warm weather.

The operation of the improved safety seat constructed in accordance with the present invention is as follows:

Normally, the seat is extended from the window frame 20 for use as illustrated in Figs. 1 to 3. If it is desired to move the seat to its inoperative position, the seat 60 is first removed from its resting position upon the top faces of the channel members 31 between the lower ends of the rods 46. The hooks 49 are then disengaged from the headed studs 50 and the ends of rods 46 are permitted to pivot about the pins 48 to their inoperative positions at the sides of the window frame 20. The thumb screws 59 are then loosened so that the springs may urge the blocks 53 into their inoperative positions at the inner ends of the tracks 51.

The end of the outermost bar 35 is then released by disengaging its respective pin 40 from the respective recess 44, to be pivoted to its inoperative position within its respective channel member 31. The same procedure is followed for the innermost bar 35. To permit the free ends of the bars 35 to pass one another, when being pivoted between the operative and inoperative positions and vice versa, it will be to slightly twist one of the channel members 31 about its respective threaded stem 34 so that the bars 35 will pass one over the other.

The channel members 31 are then pivoted to their inoperative positions alongside of one another on the top face of the stone ledge 23 about the vertical pins 33, as shown in Fig. 10.

To restore the seat to its operative position the above procedure is reversed.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A safety seat for use in combination with a window frame, comprising a pair of spaced brackets attached to the bottom portion of the window frame, a pair of channel members pivotally attached at one of their ends to said brackets to extend outwards from said window frame, a bar pivotally attached to each of said channel members for extension between the channel members, inclined supports extending from the window frame and attached to the free ends of said channel members, a seat rested on the top faces of said channel members between said inclined supports, each of said brackets comprising a top portion attached to the top face of the bottom portion of the window frame, a depending portion continuing from said top portion for attachment to the vertical face of the bottom portion of the window frame, and a horizontal portion continuing from the bottom end of said depending portion and upon the top face of which the respective channel member rests, said depending portions being formed with internally threaded bosses to which the said one ends of said channel members are attached.

2. A safety seat for use in combination with a window frame, comprising a pair of spaced brackets attached to the bottom portion of the window frame, a pair of channel members pivotally attached at one of their ends to said brackets to extend outwards from said window frame, a bar pivotally attached to each of said channel members for extension between the channel members, inclined supports extending from the window frame and attached to the free ends of said channel members, a seat rested on the top faces of said channel members between said inclined supports, each of said brackets comprising a top portion attached to the top face of the bottom portion of the window frame, a depending portion continuing from said top portion for attachment to the vertical face of the bottom portion of the window frame, a horizontal portion continuing from the bottom end of said depending portion and upon the top face of which the respective channel member rests, said depending portions being formed with internally threaded bosses to which the inner ends of said channel members are attached, a block pivotally supported within the inner portion of each of said channel members, and threaded stems extending from said blocks and threadedly engaged with said internally threaded bosses.

3. A safety seat for use in combination with a window frame, comprising a pair of spaced brackets attached to the bottom portion of the window frame, a pair of channel members pivotally attached at one of their ends to said brackets to extend outwards from said window frame, bars each pivotally attached at one of their ends to one of said channel members for extension between the channel members, inclined supports extending from the window frame and attached to the free ends of said channel members, a seat rested on the top faces of said channel members between said inclined supports, and means on each of said channel members for holding the free ends of said bars in position within the opposed channel members, said holding means comprising a leaf spring mounted on the side of each of said channel members, and a latch pin mounted on the free end of each of said leaf springs and projected through enlarged openings formed in the respective channel members, said bars having their free ends formed with recesses arranged to be engaged by said latch pins in the operative positions of said bars.

4. A safety seat for use in combination with a window frame, comprising a pair of spaced brackets attached to the bottom portion of the window frame, a pair of channel members pivotally attached at one of their ends to said brackets to extend outwards from said window frame, bars each pivotally attached at one of their ends to one of said channel members for extension between the channel members, inclined supports extending from the window frame and attached to the free ends of said channel members, a seat rested on the top faces of said channel members between said inclined supports, and means on each of said channel members for holding the free ends of said bars in position within the opposed channel members, said holding means comprising a leaf spring mounted on the side of each of said channel members, and a latch pin mounted on the free end of each of said leaf springs and projected through enlarged openings formed in the respective channel members, said bars having their free ends formed with recesses arranged to be engaged by said latch pins in the operative positions of said bars, and complementary cam surfaces formed on the free ends of said bars and said latch pins for guiding said latch pins into said recesses as said bars are pivoted to their operative position.

5. A safety seat for use in combination with a window frame, comprising a pair of spaced brackets attached to the bottom portion of the window frame, a pair of channel members pivotally attached at one of their ends to said brackets to extend outwards from said window frame, a bar pivotally attached to each of said channel members for extension between the channel members, inclined supports extending from the window frame and attached to the free ends of said channel members, a seat rested on the top faces of said channel members between said inclined supports, said inclined supports comprising elongated rods formed at their lower ends with hooks engageable with headed studs mounted on the free ends of said channel members forming the attachment of said supports to the free ends of said channel members, each of said rods being formed of pivotally connected sections to assume inoperative positions depended along the sides of the window frame when said hooks are disengaged from said headed studs, and horizontal tracks secured to said window frame above said brackets, blocks slidable in said tracks and with which the top ends of said rods are integrally formed, means resiliently urging said blocks into inoperative positions within the outer ends of said tracks, and means for releasably holding said blocks in operative positions at the inner ends of said tracks against the action of said resilient means, said resilient means comprising spaced pins extending from said blocks and said tracks and contraction springs operating between said pins.

6. A safety seat for use in combination with a window frame, comprising a pair of spaced brackets attached to the bottom portion of the window frame, a pair of channel members pivotally attached at one of their ends to said brackets to extend outwards from said window frame, a bar pivotally attached to each of said channel members for extension between the channel members, inclined supports extending from the window frame and attached to the free ends of said channel members, a seat rested on the top faces of said channel members between said inclined supports, said inclined supports comprising elongated rods formed at their lower ends with hooks engageable with headed studs mounted on the free ends of said channel members and each of said rods being formed of pivotally connected sections to assume inoperative positions depended along the sides of the window frame when said hooks are disengaged from said headed studs, horizontal tracks secured to said window frame above said brackets, blocks slidable in said tracks and with which the top ends of said rods are integrally formed, means resiliently urging said blocks into inoperative positions within the outer ends of said tracks, and means for releasably holding said blocks in operative positions at the inner ends of said tracks against the action of said resilient means, said holding means comprising thumb screws threadedly engaged through said blocks to be tightened against the base walls of said tracks.

7. A safety seat for use in combination with a window frame, comprising a pair of spaced brackets attached to the bottom portion of the window frame, a pair of channel members pivotally attached at one of their ends to said brackets to extend outwards from said window frame, a bar pivotally attached to each of said channel members for extension between the channel members, inclined supports between the free ends of said channel members and the window frame, and a seat rested on the top faces of said channel members between said inclined supports, said inclined supports comprising elongated rods formed at their lower ends with hooks engageable with headed studs mounted on the free ends of said channel members and each of said rods being formed of pivotally connected sections to assume inoperative positions depended along the sides of the window frame when said hooks are disengaged from said headed studs, horizontal tracks secured to said window frame above said brackets, blocks slidable in said tracks and with which the top ends of said rods are integrally formed, means resiliently urging said blocks into inoperative positions within the outer ends of said tracks, and means for releasably holding said blocks in operative positions at the inner ends of said tracks against the action of said resilient means, said tracks being open at their inner ends, and means preventing accidental disengagement of said blocks from said tracks.

8. A safety seat for use in combination with a window frame, comprising a pair of spaced brackets attached to the bottom portion of the window frame, a pair of channel members pivotally attached at one of their ends to said brackets to extend outwards from said window frame, a bar pivotally attached to each of said channel members for extension between the channel members, inclined supports between the free ends of said channel members and the window frame, and a seat rested on the top faces of said channel members between said inclined supports, said inclined supports comprising elongated rods formed at their lower ends with hooks engageable with headed studs mounted on the free ends of said channel members and each of said rods being formed of pivotally connected sections to assume inoperative positions depended along the sides of the window frame when said hooks are disengaged from said headed studs, horizontal tracks secured to said window frame above said brackets, blocks slidable in said tracks and with which the top ends of said rods are integrally formed, means resiliently urging said blocks into inoperative positions within the outer ends of said tracks, and means for releasably holding said blocks in operative positions at the inner ends of said tracks against the action of said resilient means, said tracks being open at their inner ends, and means preventing accidental disengagement of said blocks from said tracks, said latter-mentioned means comprising set screws threaded into said tracks at the open ends thereof to be abutted by said blocks.

ARNOLD ZUKOR.

REFERENCES CITED

The following references are of record in the file of this patent:

UNITED STATES PATENTS

| Number | Name | Date |
| --- | --- | --- |
| 980,240 | Fry | Jan. 3, 1911 |
| 1,002,510 | Frisby | Sept. 5, 1911 |
| 1,422,052 | Hanson | July 4, 1922 |
| 1,432,465 | Johnson | Oct. 17, 1922 |
| 1,493,264 | Hennessy | May 6, 1924 |
| 1,920,577 | Malinowski | Aug. 1, 1933 |
| 2,085,572 | Burda | June 29, 1937 |